US007470338B2

(12) United States Patent
Callais et al.

(10) Patent No.: US 7,470,338 B2
(45) Date of Patent: Dec. 30, 2008

(54) PROCESS FOR FORMING DENSE LAYERS IN A GYPSUM SLURRY

(75) Inventors: Bruno Callais, Carpentras (FR); Paul Jallon, Bordeaux (FR); Jean Louis Laurent, Bayas (FR); Michel Rigaudon, Saint-Loubes (FR)

(73) Assignee: LaFarge Platres, Avignon, Cedex (FR)

( * ) Notice: Subject to any disclaimer, the term of this patent is extended or adjusted under 35 U.S.C. 154(b) by 208 days.

(21) Appl. No.: 10/703,418

(22) Filed: Nov. 10, 2003

(65) Prior Publication Data

US 2004/0134585 A1 Jul. 15, 2004

Related U.S. Application Data

(63) Continuation of application No. PCT/FR02/01587, filed on May 10, 2002.

(30) Foreign Application Priority Data

May 14, 2001 (FR) .................................. 01 06381

(51) Int. Cl.

| | |
|---|---|
| ***B01F 15/02*** | (2006.01) |
| ***B01F 15/04*** | (2006.01) |
| ***B32B 37/24*** | (2006.01) |
| *B32B 13/08* | (2006.01) |
| *B32B 13/14* | (2006.01) |

(52) U.S. Cl. ............................ 156/39; 156/43; 156/44; 366/10; 366/15; 366/20; 366/38

(58) Field of Classification Search .................. 156/39, 156/45, 346, 44, 42, 43; 366/15, 3, 5, 10, 366/11, 20, 35, 38

See application file for complete search history.

(56) References Cited

U.S. PATENT DOCUMENTS

| | | | | |
|---|---|---|---|---|
| 1,776,325 A * | 9/1930 | Robinson et al. | .............. | 156/43 |
| 2,346,999 A * | 4/1944 | Sandford et al. | .............. | 156/44 |
| 2,366,673 A * | 1/1945 | Paley | .......................... | 156/43 |
| 2,940,505 A | 6/1960 | Brothers | | |

(Continued)

FOREIGN PATENT DOCUMENTS

DE 36 04 388 A 8/1987

(Continued)

OTHER PUBLICATIONS

Translation for Japan 05-148001 (Dec. 2007).*

*Primary Examiner*—Steven D Maki
(74) *Attorney, Agent, or Firm*—Buchanan Ingersoll & Rooney PC

(57) ABSTRACT

A process for manufacturing plasterboard and a plasterboard manufacturing unit are provided, the process including feeding hydratable calcium sulphate and water into a first mixer (2) and into a second mixer (3); feeding in a facing (5); preparing a first gypsum slurry in the first mixer (2); preparing a second gypsum slurry in the second mixer (3); applying the first slurry onto the facing and forming a crude surface layer; applying the second slurry onto the crude surface layer and forming a crude core layer with a density lower than that of the crude surface layer; forming a plasterboard; hydrating and drying the board. This process allows the formation of the different layers of gypsum to be controlled independently.

21 Claims, 2 Drawing Sheets

U.S. PATENT DOCUMENTS

| | | | | | |
|---|---|---|---|---|---|
| 3,459,620 | A | * | 8/1969 | McCleary et al. | 156/346 |
| 4,195,110 | A | | 3/1980 | Dierks et al. | |
| 4,288,263 | A | * | 9/1981 | Delcoigne et al. | 156/42 |
| 4,378,405 | A | * | 3/1983 | Pilgrim | 156/42 |
| 4,499,561 | A | * | 2/1985 | Mason et al. | 366/156.2 |
| 4,942,003 | A | | 7/1990 | Bold | |
| 5,714,032 | A | | 2/1998 | Ainsley et al. | |
| 5,908,521 | A | | 6/1999 | Ainsley et al. | |
| 6,001,496 | A | * | 12/1999 | O'Haver-Smith | 428/703 |
| 6,059,444 | A | * | 5/2000 | Johnson et al. | 366/172.2 |
| 6,187,409 | B1 | * | 2/2001 | Mathieu | 428/70 |
| 6,190,476 | B1 | | 2/2001 | Seecharan et al. | |
| 6,878,321 | B2 | * | 4/2005 | Hauber et al. | 156/45 |
| 2001/0044016 | A1 | * | 11/2001 | Watras | 156/45 |

FOREIGN PATENT DOCUMENTS

| | | | | |
|---|---|---|---|---|
| EP | 0 634 255 | A1 | | 1/1995 |
| EP | 0 634 476 | A | | 1/1995 |
| EP | 0 957 212 | A2 | | 11/1999 |
| EP | 0 985 504 | A1 | | 3/2000 |
| GB | 2248448 | | * | 4/1992 |
| JP | 05-148001 | | * | 6/1993 |
| JP | 5-148001 | | | 6/1993 |

* cited by examiner

PROCESS FOR FORMING DENSE LAYERS IN A GYPSUM SLURRY

CROSS-REFERENCE TO RELATED APPLICATIONS

The present application is a by-pass continuation of PCT/FR02/01587, filed on May 10, 2002, and which claims the priority of French Patent Application No. 01/06381, filed on May 14, 2001. The contents of PCT/FR02/01587 and French Patent Application No. 01/06381 are hereby incorporated herein by reference.

BACKGROUND OF THE INVENTION

The present invention relates to a process and device for manufacturing plasterboard and more particularly plasterboard with a gypsum core the density of which varies as a function of the distance in relation to the surface. In order to lighten the plasterboard, a known technique is to make plasterboard with a low density core layer by introducing foaming agents into the slurry. This core layer is flanked by high density surface layers. The surface layers of gypsum form one piece with the cardboard sheets. Moreover, the surface layers have a low volume of gas bubbles. The adhesion of this slurry to the cardboard sheet is therefore improved. The surface layers also increase the hardness and rigidity of the plasterboard.

There is therefore a need for a process and a device for manufacturing plasterboard with a core layer presenting a given density and two surface layers the density of which is higher than that of the core layer. Moreover, there is a need for a process and a device for manufacturing this type of board that enables the quantities of additives and foaming agents to be reduced, rejects during the drying stage to be reduced, the bond between the plaster and the cardboard sheets to be improved and which also favours production control and increases the availability of the manufacturing unit.

SUMMARY

The aim of the invention is to provide a solution to one or several of these problems.

The invention thus relates to a process for manufacturing plasterboard comprising the steps of feeding hydratable calcium sulphate and water into a first mixer; feeding hydratable calcium sulphate and water into a second mixer; feeding in a facing; preparing a first gypsum slurry in the first mixer; preparing a second gypsum slurry in the second mixer; applying the first gypsum slurry onto the facing and forming a crude surface layer; applying the second gypsum slurry onto the crude surface layer and forming a crude core layer with a composition different to that of the crude surface layer; forming a crude plasterboard; hydrating and drying the plasterboard.

According to an embodiment of the process of the invention, the crude surface layer has a density that is different to that of the crude core layer.

According to another embodiment of the process of the invention, the crude surface layer has a density that is higher than that of the crude core layer.

According to yet another embodiment of the invention, the process comprises, in addition, before the board formation stage, preparation steps for a third gypsum slurry; the formation of a second crude surface layer with a density higher than that of the crude core layer.

According to yet another embodiment of the invention, the process comprises, in addition, a stage whereby a second crude surface layer is applied over the crude core layer.

Another possible embodiment of the invention is for the process to comprise, in addition, before the formation of the second surface layer stage, a stage of feeding in a second facing; applying the third gypsum slurry onto the second facing.

According to an embodiment of the process of the invention, the third gypsum slurry is applied over the second facing and the process comprises, in addition, after the application stage of the third gypsum slurry, a stage of turning over the second facing.

According to another embodiment of the process of the invention, the first and third gypsum slurries are produced in separate mixers.

According to another embodiment of the process of the invention, a layer forming stage comprises a gypsum slurry spreading operation.

According to yet another embodiment of the process of the invention, a crude surface layer has a density of between 1.2 and 2.

It may also be arranged for the core layer to have a density of between 1 and 1.2.

According to an embodiment of the process of the invention, a surface layer has a density of between 0.8 and 1.2 after drying.

According to another embodiment of the invention, the core layer has a density of between 0.6 and 1.2 after drying.

According to yet another embodiment of the process of the invention, the ratio of surface layer density to core layer density is between 1 and 1.5 after drying.

According to yet another embodiment of the process of the invention, a surface layer has a quantity of starch less than 15 $g/m^2$ after drying.

Moreover, it may also be arranged to have a surface layer with a thickness of between 0.1 and 0.5 mm after the formation of the board.

According to an embodiment of the process of the invention, a facing made out of cardboard or a fibre glass base is used.

The invention also provides a device for manufacturing plasterboard, comprising means for feeding in a facing; a first mixer for preparing a first gypsum slurry; means for applying the first gypsum slurry onto the facing; means for forming a crude surface layer on the facing; a second mixer for preparing a second gypsum slurry; means for applying the second gypsum slurry onto the crude surface layer; means for forming a crude core layer on the crude surface layer; means for forming a plasterboard.

According to an embodiment of the invention, the device comprises, in addition, a third mixer for preparing a third gypsum slurry.

According to another embodiment of the invention, the device comprises, in addition, means for feeding in a second facing.

According to yet another embodiment of the invention, the device comprises, in addition, means for applying the third gypsum slurry over the second facing.

According to yet another embodiment of the invention, the device comprises means for turning over the second facing.

In a specific embodiment of the invention, the device comprises, in addition, means for forming a second crude surface layer.

According to an embodiment of the invention, the device comprises, in addition, means for applying the second crude surface layer onto the crude core layer.

According to another embodiment of the invention, the device comprises means for driving along the facing and crude layers.

According to yet another embodiment of the device of the invention, the application zone for the first gypsum slurry, the means for forming the first crude surface layer, the application zone for the second gypsum slurry and the means for forming the crude core layer are positioned one after another along the drive direction, the means for forming the first crude surface layer being the first in the line.

According to yet another embodiment of the device of the invention, the distance between a mixer and the gypsum slurry application zone is less than 1.50 meters.

The device may also comprise a circuit for feeding at least hydratable calcium sulphate into the mixers, at least part of which is shared by the mixers.

According to an embodiment of the invention, the device comprises, in addition, means for calibrating a layer of crude gypsum.

According to another embodiment of the invention, the device comprises, in addition, a hydration unit and a unit for drying the plasterboard that is formed.

According to yet another embodiment of the invention, at least the mixer for the first slurry comprises a rotor turning in a mixing chamber; means for feeding in water near to the axis of the rotor; a gypsum slurry outlet that communicates with the corresponding means for applying the gypsum slurry.

According to yet another embodiment of the invention, each mixer has means for feeding in water; means for feeding in additives; independent means for adjusting the output of the means for feeding in water or the means for feeding in additives.

Still further objects and advantages of the invention will become apparent on reading the description that follows of embodiments of the invention, which are given as examples, with reference to the drawings.

DESCRIPTION OF PREFERRED EMBODIMENT

A manufacturing unit comprises two independent mixers for preparing gypsum slurry. One mixer is used to form a crude surface layer on the facing, at least one other mixer is used to form a crude core layer on the surface layer, the crude core layer having a different composition to that of the crude surface layer.

Figures 1, 2:
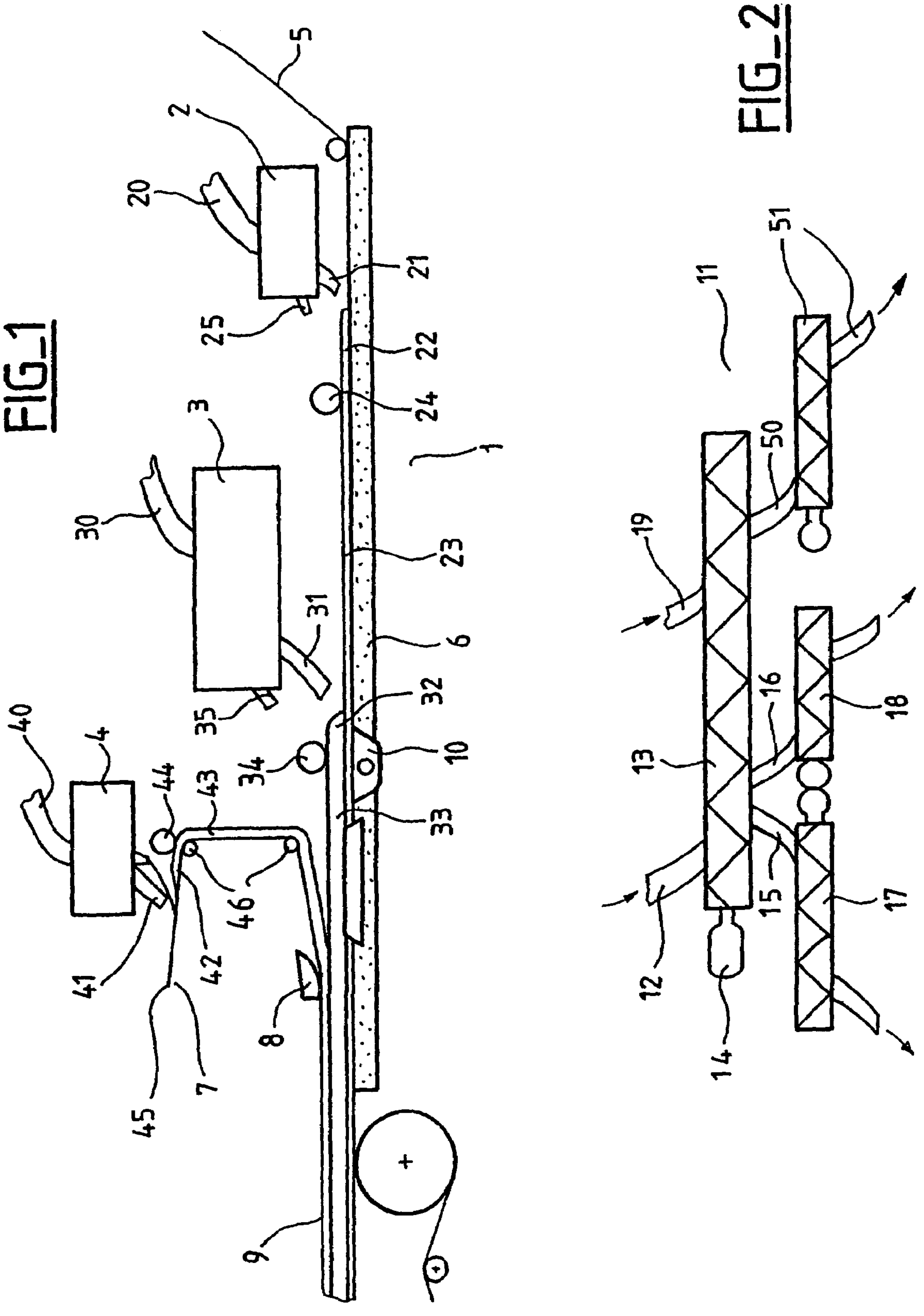
FIG. 1 is a side view of a plasterboard manufacturing unit.
FIG. 2 is a side view of a device for feeding hydratable calcium sulphate into the mixers.

FIG. 1 shows a side view of a manufacturing unit 1 for plasterboard. This unit has three rotor mixers 2, 3, and 4, fed with hydratable calcium sulphate and water via respective inlets 20, 30 and 40, for the preparation of three gypsum slurries. Each mixer has a slurry outlet, which communicates with a corresponding duct 21, 31 and 41 for applying the slurry. A first facing 5 moves along a table 6 placed under the gypsum slurry duct outlets 21, 31, 41 of the mixers 2, 3 and 4. The mixers are placed one after each other along the direction that the first facing moves along. A high density gypsum slurry 22 comes out of the first mixer, is applied onto the first facing and formed into a calibrated layer 23 by a roller 24. This layer 23 will be called the first surface layer. A low density gypsum slurry 32 comes out of the second mixer, is applied onto the first layer 23 and is formed into a calibrated layer 33 by a roller 34. This layer 33 will be called the core layer. The central plane of the plasterboard is included in this core layer. A high density slurry 42 comes out of the third mixer 4, then is applied onto a second facing 7. This slurry 42 is formed into a calibrated layer 43 by a roller 44, then applied onto the core layer 33. The assembly formed by the layers of gypsum and the facings goes through a forming unit 8. A plasterboard 9 comes out. This board 9 is then driven along and goes through a hydration unit, then a drying unit (not shown).

The manufacturing unit 1 in FIG. 1 thus has at least one mixer 2 for preparing a gypsum slurry intended to form a surface layer 22. This mixer 2 is independent of the second mixer 3 for preparing a gypsum slurry intended to form a core layer 32. It is thus possible to create a core layer 33 and a surface layer 23 in the plasterboard, these layers having different physical properties. This advantage will be described in more detail later in the description of the process for operating the manufacturing unit. This manufacturing unit also enables the composition of one or two layers in the plasterboard to be selectively changed without affecting the characteristics of the other layers. One may, for example, adapt the composition of a surface layer to the facing on which this layer is applied, by using different mixing ratios in the mixers. It is also possible to vary the flow rate or the quantity of an additive in only one of the layers. It is then, for example, possible to modify the characteristics of one layer in a plasterboard while continuing to produce in a continuous manner. The use of several mixers allows small mixers to be used. Moreover, it is possible to use different gypsum powders in the different mixers. Furthermore, the size of the application ducts 21, 31 and 41 may thus be reduced by bringing the mixers closer to table 6. The risk of blocking the ducts with gypsum agglomerate is thus reduced. The mixer outlets are preferably placed at a distance of less than 1.5 meters from the table 6.

The manufacturing unit comprises means for driving along the first facing. This first facing may thus be driven along, for example, by a hydration line conveyor belt. This first facing 5 may be made to move along the flat table 6.

The application duct 21 conveys the first gypsum slurry from the mixer onto the facing 5. The slurry application duct 21 is situated at the most upstream point along the line the facing moves along. The outlet of this duct is placed over the facing 5 in order to apply the first slurry from mixer 2 onto this facing.

The roller 24 is placed downstream of the duct outlet 21 and enables a first surface layer with calibrated thickness to be formed, from the first gypsum slurry that has been applied. A roller is preferably used, whose speed of rotation and/or the distance in relation to the table 6 may be adjusted in order to make it possible to modify the thickness of the first surface layer. The roller also makes it possible to spread out the slurry over the full width of the facing 5.

The application duct 31 conveys the second gypsum slurry from the mixer 3 onto the first surface layer 23. The application duct 31 for the second gypsum slurry is placed downstream of the roller 24. The outlet of this duct is placed above the facing 5 and the surface layer 23.

The roller 34 is placed downstream of the outlet of the duct 31. The roller has a function of forming the core layer 33 from the second slurry, a function of calibrating the thickness of this core layer 33 and a function of spreading out the slurry of this layer and making it uniform.

It is also possible to equip the manufacturing unit with vibrating elements 10. The vibrating elements 10 make it possible to uniformly spread out the gypsum slurry over the whole width of the facing. Since the quantity of gypsum slurry applied to form the core layer is generally greater than the quantity of slurry used for the surface layers, it is particularly advantageous to place the vibrating elements at the application zone for the second gypsum slurry.

The application duct 41 conveys the gypsum slurry from the mixer 4 onto the second facing 7. The outlet of the duct is placed above the facing 7.

The roller 44 is placed downstream of the outlet of the duct 41. The roller also has functions of shaping, calibrating, spreading out and making uniform the slurry and the second surface layer 43.

In order to promote the adhesion of the surface layers 23 and 43 to their respective facings 5 and 7, it is preferable to use a manufacturing unit in which the application of the corresponding gypsum slurries is achieved firstly on the facings. In the example in FIG. 1, the facings are firstly driven along substantially opposite directions. Thus, the initial drive direction of facing 7 is opposite to the drive direction of the plasterboards. Free or motor-driven rollers are used to inverse the drive direction of the facing 7. It can be seen in FIG. 1 that the surface layer 43 is placed in a vertical position and then turned over before being applied onto the core layer 33. By making a third gypsum slurry with suitable viscosity, by adding, for example, additives or by modifying the mixing ratio, it is possible to prevent the surface layer 43 from dissociating from the facing 7 or prevent this surface layer disintegrating.

Downstream of rollers 34 and 44, the second surface layer 43 is applied against the core layer 33. To do this, one may, for example, use one or several rollers that press against the facing 7 in order to place the surface layer 43 in contact with the core layer 33. Downstream of the application zone between the second surface layer and the core layer, the assembly formed by the gypsum layers and the facings goes through a passage between a forming plate 8 and the table 6. The distance between the forming plate and the table approximately determines the thickness of the plasterboard 9 formed when it goes through the passage.

It is possible to install devices for controlling 25, 35, 45 and regulating the layers. One may, for example, use an optical beam to measure the quantity of slurry at the forming roller level. On may thus measure the distance between a sensor and an aggregate of slurry placed upstream of roller 34. This measurement may then be used to modify the flow rate of slurry from the mixer or to modify the quantity of water or foaming agent introduced into this mixer. The formation of each layer may thus be better controlled. The density of each layer produced thus varies extremely little during the manufacture of the plasterboards.

The plasterboard manufacturing process is thus stable.

FIG. 2 shows a side view of a hydratable calcium sulphate feeding device 11 for the mixers 2, 3 and 4. Hydratable calcium sulphate and, if appropriate, solid or liquid additives such as foaming agents or adhesion promoting agents are introduced via an inlet 12 in a screw conveyor 13. The screw conveyor 13 is driven, for example, by a motor 14. The products introduced move along the screw conveyor 13. The screw conveyor 13 also makes it possible to mix the calcium sulphate and the different additives.

In the embodiment of the invention shown, the screw conveyor 13 has along its length two intermediate outlets 15 and 16. These outlets communicate with the inlet of two other screw conveyors 17 and 18. The screw conveyors 17 and 18 convey the products respectively up to the first and third mixers 2 and 4.

The first screw conveyor 13 has at least one other inlet 19 placed downstream of the two outlets. This inlet 19 enables additional additives to be introduced, such as glass fibre of foaming agents. The downstream extremity of the first screw conveyor 13 communicates with the inlet 50 of another screw conveyor 51. This screw conveyor 50 conveys the initial products and the additional additives to the second mixer 3.

This embodiment of the invention allows a shared part of the feed circuit to be used for the three mixers. It also enables the composition of the products to be modified as a function of the mixer in which these products are introduced. Thus, it is possible to only insert glass fibres into the second mixer 3. One thus avoids blocking the first and third mixers 2 and 4, which generally have smaller dimensions than that of the second mixer. It is also possible to add foaming agents into the second mixer to reduce the density of the slurry formed therein.

Figure 3:
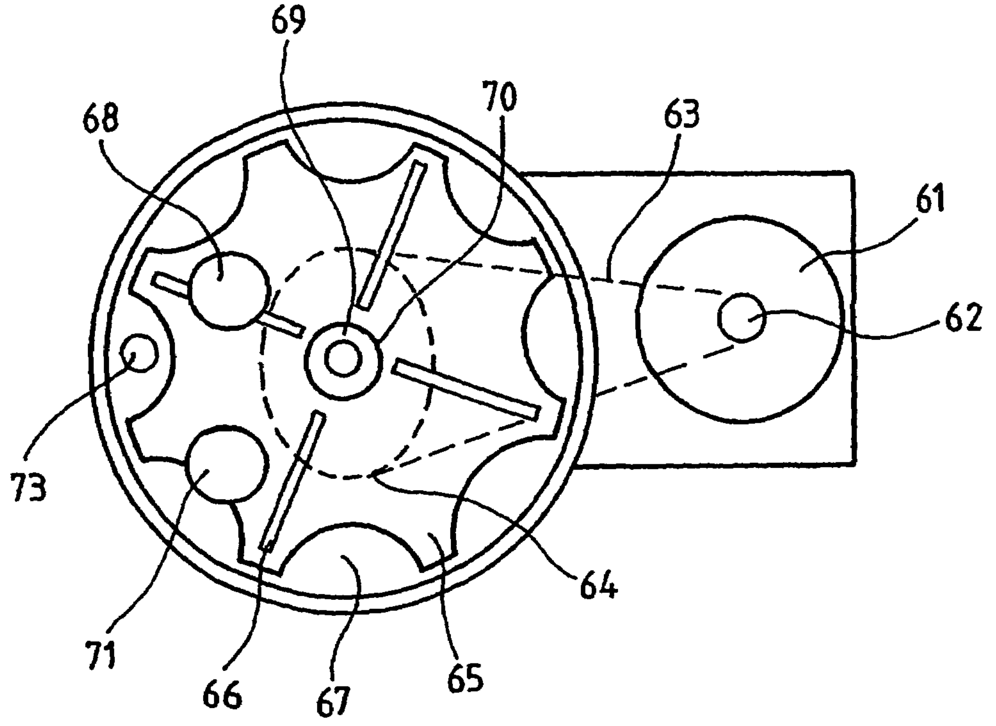
FIG. 3 is a top view of the interior of a mixer according to an embodiment of the invention.
Figure 4:
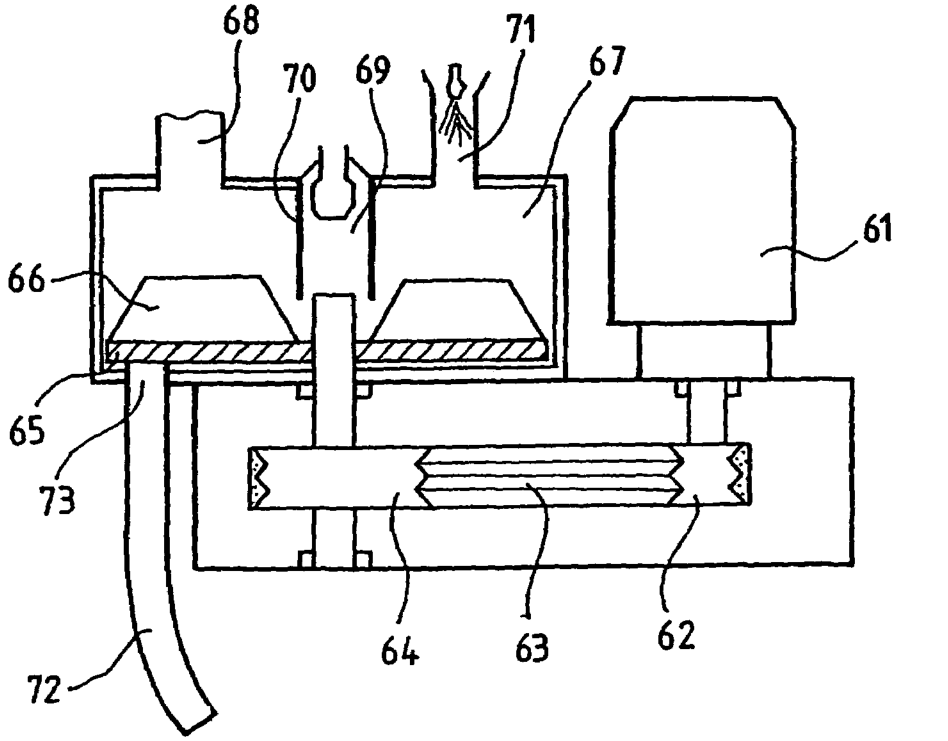
FIG. 4 is a cross sectional view of the mixer in FIG. 3.

The invention also relates to a mixer for preparing slurry. An embodiment of such a mixer is shown schematically in FIGS. 3 and 4. In order to make the figures easier to understand, FIG. 4 represents an imaginary cross section through the main elements of FIG. 3. The mixer has a drive motor 61, a drive shaft 62, a rotor shaft 64, a transmission belt connecting shafts 62 and 64 and a rotor 65 integral with shaft 64.

The rotor 65 is, for example, mounted to rotate in a cylindrical mixing chamber 67. This rotor has, for example, a flat surface in the form of a disk, which has teeth at its radial extremities. The rotor may, if appropriate, have ribs 66, which spread out, for example, perpendicularly to the flat surface, in order to ensure better mixing of the gypsum slurry.

The mixer has a feed inlet 68 for calcium sulphate and other products, that opens out in the mixing chamber. It also has a water feed 69 that opens out in the mixing chamber 67. The hydratable calcium sulphate, the additives and the water are mixed by the rotor 65 in order to form a homogeneous gypsum slurry.

The feed 69 is arranged to project water at the centre of the rotor 65. It is, for example, introduced in a sleeve 70 that overhangs the rotor axis. Under the effect of the rotation of the rotor, the water that is introduced moves over the flat surface of the rotor towards the exterior of the mixing chamber and cleans the flat surface. Any aggregates of gypsum slurry are thus removed from the flat surface. This water also makes it possible to impregnate the calcium sulphate as well as any additives.

A second water feed (not shown) may also be added to increase the flow of water. This feed may, for example, inject water at the level of the calcium sulphate feed duct 68.

The mixer also has an outlet 73 located in the bottom of the mixing chamber 67. This outlet is arranged radially towards the exterior of the mixing chamber in order to evacuate the gypsum slurry that is centrifuged by the rotation of the rotor. A feed duct 72 is placed at the level of this outlet and makes it possible to apply the gypsum slurry formed onto a facing, for example.

The mixer may also have a vent hole 71 that opens out in the mixing chamber. This vent hole 71 is placed above the mixing chamber 67. Its purpose is to remove dust suspended in the mixing chamber. When the rotor rotates, dust filled air goes through the vent hole and is evacuated. A water injection point may be placed in the vent hole to solubilise the dust and incorporate it into the gypsum slurry. The air coming out of the vent hole is thus dust free.

The feed inlet 68 for hydratable calcium sulphate, the vent hole 71 and the outlet 73 of the mixing chamber are arranged relative to each other in a preferential manner. If it is taken that the rotor turns in a clockwise direction in FIG. 3, the calcium sulphate inlet is arranged at a very low angle after the chamber outlet. Thus, the gypsum powder and the additive are turned at least one full cycle in the mixing chamber 67 before being evacuated. The powder may thus be better impregnated with the water. Moreover, the vent hole 71 is, preferably, arranged at a very low angle before the mixer outlet. The majority of the dust generated at the powder inlet is thus impregnated in the water before reaching the vent hole. Due to the distance between the vent hole and the calcium sulphate feed, the vent hole thus has less dust to deal with.

The mixer may also have a feed for setting retarder that opens out in the mixing chamber. The mixer may also have a separate feed for any additives. These feeds may also be individually regulated. All of the quantities of additives may thus be controlled directly at the mixer level. The dosing of the gypsum slurry to be formed may thus be very accurate.

The invention also relates to a process for manufacturing plasterboard according to the invention. In the description that follows, crude gypsum layer will be taken to mean a gypsum layer in which the setting or the hydraulic bonding is not completed. Gypsum layers that have not yet gone through the drying stage are designated in this way.

According to an embodiment of this process hydratable calcium sulphate and water are fed into the first, second and third mixers 2, 3 and 4. Gypsum slurries are thus prepared in each of the mixers. These gypsum slurries are prepared in such a way as to obtain a slurry in the second mixer, the density of which is lower than that of the slurry in the first and third mixers. Several gypsum slurries with identical densities but with different physical properties, for example different tensile strengths or different fillers may also be prepared within the scope of the invention. Several parameters allow gypsum slurries with different densities to be obtained. It is thus possible to introduce different foaming agents, to use different mixing ratios, or to use different mixer rotating speeds or to use different fillers.

The first gypsum slurry from the first mixer is then applied to the first facing. A first crude surface layer is thus formed. This layer may be rendered uniform, spread out and calibrated as described previously.

The second gypsum slurry from the second mixer is then applied over the first crude surface layer. A crude core layer is thus formed with a lower density than that of the first crude surface layer. This core layer may also be rendered uniform, spread out and calibrated.

The third gypsum slurry from the third mixer is applied onto the second facing. A second crude surface layer is thus formed with a density higher than that of the crude core layer. As in the example of FIGS. 1 and 2, it is preferable to form the second crude surface layer on the second facing beforehand. The facing and the surface layer formed are then turned over and applied to the core layer. This turning over operation may be achieved by using the return rollers 46, which allow the facing 7 to be deviated. These rollers act on the face of the facing opposite the face that receives the third gypsum slurry. Thus, the layer 43 is not deformed by the rollers 46. These rollers may also be motor-driven to drive along the facing 7.

The second crude surface layer is then applied over the crude core layer. The assembly may then be calibrated as described previously.

The crude plasterboard formed thereof is then left to hydrate while allowing the gypsum to set. The board is then dried to remove excess water from the board.

This process also allows gypsum slurries with very different densities to be prepared independently. One can thus obtain a high density surface layer, which promotes adhesion between the surface layer and the facing. It is thus possible to reduce or eliminate the addition of bonding additives in the gypsum slurry intended to form the surface layer. One can thus use a quantity of starch less than 15 g/m$^2$. Moreover, a high density surface layer resists calcination better in the drier. The risk of producing defective boards is thus reduced. One can thus reduce or eliminate the addition of anti-calcination additives such as tartric acid. A high density surface layer also rigidises the whole board. Thus, the higher the density of the surface layer, the more the density of the core layer may be reduced. In this way, lightweight plasterboard can be produced.

It is thus possible to prepare a gypsum slurry with a density of between 1.2 and 1.6 kg/l in the first and third mixers, which is then used to form the surface layers. It is possible, if necessary, to prepare a gypsum slurry with a density of between 1.6 and 2 kg/l. It is also possible to prepare a gypsum slurry in the second mixer with a density of between 1 and 1.2 kg/l, which is then used to form the core layer. A ratio of 1.1 and 1.6 between the density of the crude surface layers and the density of the core layer is particularly suitable.

Such values may be obtained by using, for example, a mixing ratio of 0.57 in the first and third mixers and a mixing ratio of 0.62 in the second mixer. Preferably, a ratio of 0.8 to 1.25 between the mixing ratios of the dense slurry and the less dense slurry is used.

The plasterboard obtained after drying is also characterised by the densities of the different layers. Due to the evaporation during drying, the final density of the layers is less than the density of the crude layers. Dried surface layer densities of between 0.8 and 1.2 are thus obtained. The density of the core layer is between 0.6 and 1.2. The ratio between the density of the surface layers and the density of the core layer is also preferably between 1 and 1.5 after drying.

Tests have shown that the bond between layers with different densities is sometimes damaged. This may be remedied by adjusting the hydration rates for each of the layers, while ensuring that the hydration rate of the core layer is faster than the hydration rate of the surface layers.

The surface layers formed have, preferably, a thickness of between 0.1 and 0.5 mm. A thickness of 0.3 mm is particularly suitable to rigidify the plasterboard and harden one of its faces.

The facings are, for example, made out of cardboard. A facing may also be made out of glass fibre, for example glass fibre mat, in order to provide good fire resistance.

Obviously, the present invention is in nowise limited to the examples of the embodiments of the invention described and represented, but it may be subject to numerous variations accessible to those skilled in the art. Although we have previously described a manufacturing unit comprising three mixers, a manufacturing unit comprising a single mixer to produce the surface layers remains within the scope of the appended claims. Although in the process described, we have described the formation of two surface layers, the formation of a single surface layer is also within the scope of the appended claims. Moreover, the possibility of using different sources of gypsum for the different layers is also within the scope of the appended claims.

What is claimed is:

1. A process for manufacturing plasterboard, comprising the following steps:

feeding a first addition into a screw conveyor at a first inlet, wherein the first addition comprises hydratable calcium sulphate and water, wherein the screw conveyor conveys in a downstream direction;

withdrawing a first feed from a first outlet of the screw conveyor;

withdrawing a second feed from a second outlet of the screw conveyor;

feeding a second addition into the screw conveyor at second inlet, wherein the second inlet is downstream from the first inlet, first outlet and second outlet;

withdrawing a third feed from a third outlet of the screw conveyor, wherein the third outlet is downstream from the second inlet, wherein the first and second feed have a different composition from the third feed;

feeding the first feed into a first mixer;

feeding the third feed into a second mixer that is independent of the first mixer;

feeding in a facing;

preparing a first gypsum slurry in the first mixer;

preparing a second gypsum slurry in the second mixer;

applying the first gypsum slurry onto the facing and forming a crude surface layer;

applying the second gypsum slurry onto the crude surface layer and forming a crude core layer that has a different composition to that of the crude surface layer;

feeding in a second facing;

feeding the second feed into a third mixer; preparing a third gypsum slurry in the third mixer;

wherein the third mixer is independent of first mixer and the second mixer;

wherein the first, second and third mixers are arranged in parallel and not in series;

applying the third gypsum slurry onto the second facing and forming a second crude surface layer with a different composition than that of the crude core layer;

applying the second crude surface layer onto the crude core layer;

forming a crude plasterboard; and hydrating and drying the plasterboard.

2. The process according to claim 1, wherein the third gypsum slurry is applied over the second facing and in that the process comprises, in addition, after the application stage for the third gypsum slurry, a stage of turning over the second facing.

3. The process according to claim 1, wherein a layer formation stage comprises an operation of spreading out a gypsum slurry.

4. The process according to claim 1, wherein the crude surface layer has a density of between 1.2 and 2 kg/L.

5. The process according to claim 1, wherein the crude core layer has a density of between 1 and 1.2 kg/L.

6. The process according to claim 1, wherein a surface layer has a density of between 0.8 and 1.2 kg/L after drying.

7. The process according to claim 1, wherein the core layer has a density of between 0.6 and 1.2 kg/L after drying.

8. The process according to claim 1, wherein the ratio of surface layer density to core layer density is between 1 and 1.5 kg/L after drying.

9. The process according to claim 1, wherein a surface layer has a quantity of starch less than 15 g/m2 after drying.

10. The process according to claim 1, wherein a surface layer has a thickness of between 0.1 and 0.5 mm after the formation of the board.

11. The process according to claim 1, wherein the facing is a glass fibre mat.

12. The process according to claim 1, wherein the second facing is a glass fibre mat.

13. The process according to claim 1, wherein the facing is made out of cardboard.

14. The process according to claim 1, wherein the second facing is made out of cardboard.

15. The process according to claim 1, wherein the second addition to the screw conveyor comprises a foaming agent.

16. The process according to claim 15, wherein the crude surface layer and the second crude surface layer have a higher density than that of the crude core layer.

17. The process according to claim 1, wherein the second addition to the screw conveyor comprises glass fibres.

18. The process according to claim 1, further comprising:

feeding the first feed to a second screw conveyor before feeding the first mixer.

19. The process according to claim 1, further comprising:

feeding the second feed to a third screw conveyor before feeding the third mixer.

20. The process according to claim 1, further comprising:

feeding the third feed to a fourth screw conveyor before feeding the second mixer.

21. The process according to claim 1, further comprising:

feeding the first feed to a second screw conveyor before feeding the first mixer;

feeding the second feed to a third screw conveyor before feeding the third mixer; and feeding the third feed to a fourth screw conveyor before feeding the second mixer.

* * * * *